United States Patent
Slack (10) Patent No.: US 9,952,068 B2
(45) Date of Patent: Apr. 24, 2018

(54) OPTICAL ELEMENT

(71) Applicant: RENISHAW PLC, Wotton-under-Edge, Gloucestershire (GB)

(72) Inventor: Jason Kempton Slack, Bristol (GB)

(73) Assignee: RENISHAW PLC, Wotton-Under-Edge (GB)

(*) Notice: Subject to any disclaimer, the term of this patent is extended or adjusted under 35 U.S.C. 154(b) by 201 days.

(21) Appl. No.: 14/651,495

(22) PCT Filed: Oct. 15, 2013

(86) PCT No.: PCT/GB2013/052684
§ 371 (c)(1),
(2) Date: Jun. 11, 2015

(87) PCT Pub. No.: WO2014/096764
PCT Pub. Date: Jun. 26, 2014

(65) Prior Publication Data
US 2015/0308865 A1    Oct. 29, 2015

(30) Foreign Application Priority Data

Dec. 20, 2012  (EP) .................................. 12250185
Jan. 23, 2013  (GB) .................................. 1301186.1

(51) Int. Cl.
*G01D 5/38* (2006.01)
*G01D 5/36* (2006.01)

(52) U.S. Cl.
CPC .............. *G01D 5/38* (2013.01); *G01D 5/366* (2013.01)

(58) Field of Classification Search
CPC .................................. G01D 5/366; G01D 5/38
See application file for complete search history.

(56) References Cited

U.S. PATENT DOCUMENTS

| | | | |
|---|---|---|---|
| 4,602,436 | A | 7/1986 | Ernst |
| 4,776,701 | A | 10/1988 | Pettigrew |
| 4,959,542 | A | 9/1990 | Stephens |
| 5,068,530 | A | 11/1991 | Ieki et al. |
| 5,182,613 | A | 1/1993 | Ieki et al. |
| 5,332,896 | A | 7/1994 | Holzapfel |
| 5,604,345 | A | 2/1997 | Matsuura |
| 5,748,373 | A | 5/1998 | Hane et al. |

(Continued)

FOREIGN PATENT DOCUMENTS

| | | |
|---|---|---|
| CN | 1973185 A | 5/2007 |
| CN | 101750108 A | 6/2010 |

(Continued)

OTHER PUBLICATIONS

Jun. 1, 2016 Office Action issued in Chinese Patent Application No. 201380072987.1.

(Continued)

*Primary Examiner* — Tony Ko
(74) *Attorney, Agent, or Firm* — Oliff PLC (57) ABSTRACT

An optical element for generating diffraction orders for an encoder apparatus, in which the optical element includes an array of diffraction features arranged such that the spacing between the centers of adjacent diffraction features varies irregularly from one pair of adjacent features to the next.

23 Claims, 6 Drawing Sheets

(56) References Cited

U.S. PATENT DOCUMENTS

| | | |
|---|---|---|
| 5,814,812 A | 9/1998 | Holzapfel |
| 5,861,953 A | 1/1999 | Henshaw |
| 6,094,307 A | 7/2000 | Ieki |
| 6,097,490 A | 8/2000 | Holzapfel et al. |
| 6,198,534 B1 | 3/2001 | Hofer et al. |
| 7,112,782 B2 | 9/2006 | Hofer |
| 7,659,992 B2 | 2/2010 | McMurtry et al. |
| 2003/0010906 A1 | 1/2003 | Lee |
| 2009/0279100 A1* | 11/2009 | McMurtry ............... G01D 5/38 356/499 |

FOREIGN PATENT DOCUMENTS

| | | |
|---|---|---|
| DE | 4436784 A1 | 4/1995 |
| EP | 0887625 A2 | 12/1998 |
| EP | 2 113 748 A2 | 11/2009 |
| EP | 2 199 752 A1 | 6/2010 |
| JP | H03-048122 A | 3/1991 |
| JP | H08-285637 A | 11/1996 |
| JP | 2005-121640 A | 5/2005 |
| JP | 2008-503745 A | 2/2008 |
| WO | 2005/124282 A2 | 12/2005 |
| WO | 2012/136284 A1 | 10/2012 |

OTHER PUBLICATIONS

Jan. 16, 2014 International Search Report issued in International Patent Application No. PCT/GB2013/052684.

Jul. 10, 2013 Search Report issued in European Patent Application No. 12250185.1.

Mar. 15, 2013 Search Report issued in British Patent Application No. 1301186.1.

Mar. 29, 2017 Office Action issued in Chinese Application No. 201380072987.1.

Oct. 11, 2017 Office Action issued in European Application No. 13 780 378.9.

Sep. 26, 2017 Office Action issued in Japanese Application No. 2015-548743.

* cited by examiner

OPTICAL ELEMENT

This invention relates to an optical element, and in particular to an optical element such as a diffraction grating used in a position measurement device.

Figure 1:
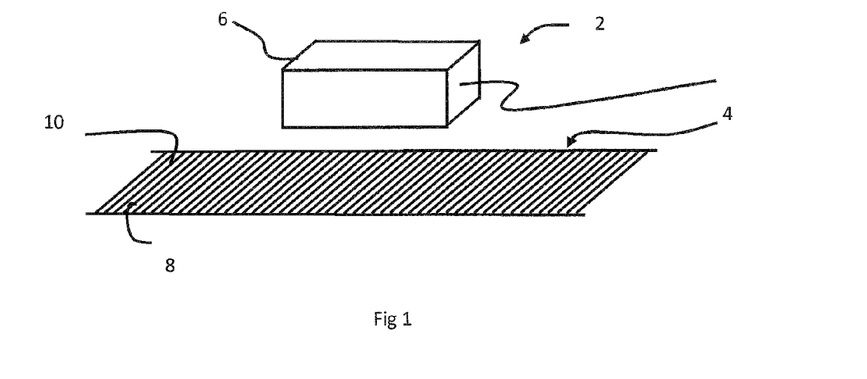
FIG. 1 is a schematic view of an encoder apparatus comprising a readhead and a scale.

As schematically illustrated by FIG. 1, an encoder apparatus 2 can be used to determine movement between two relatively moveable parts of an apparatus, and typically comprises a scale 4 and a readhead 6 (one provided on one part of the apparatus and the other on the other part of the apparatus). The scale can comprise a series of features 8, 10 which the readhead can read so as to measure its position along the scale (the scale's features, for example, could be provided on a substrate which is fastened to the part of the apparatus, or could even be formed integrally as part of the apparatus). An encoder can work by, for example, essentially "counting" its position along the length of the scale, e.g. from start-up and/or from a defined reference marker(s) on the scale.

Figure 2A:
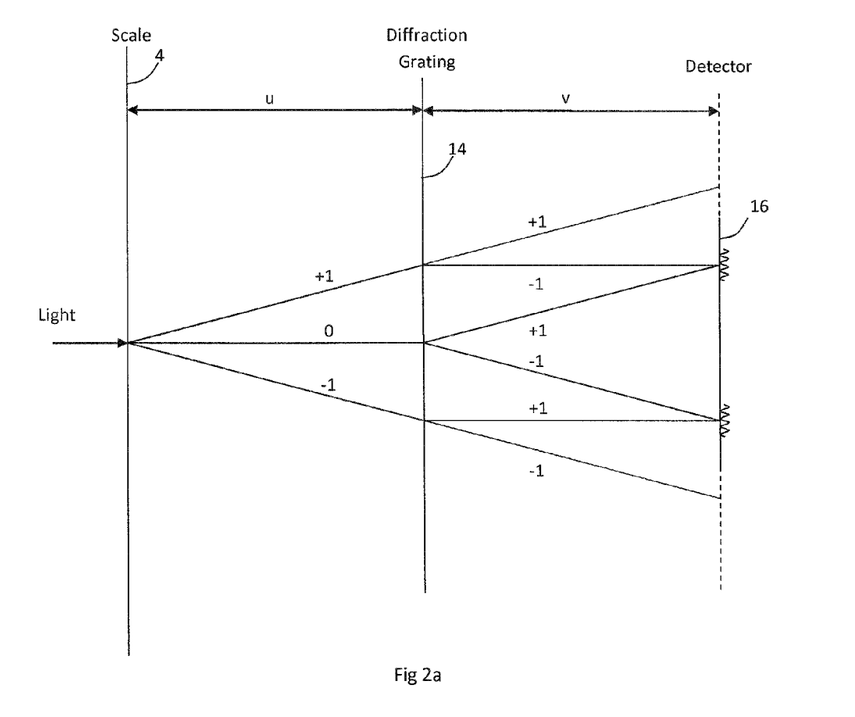
FIGS. 2a and 2b are schematic ray diagrams for an encoder apparatus.

As will be understood, the way in which the "counting" of the readhead's position is done can vary from encoder apparatus to encoder apparatus. For example, one way is to generate interference fringes at a detector in the readhead. FIG. 2a is a schematic ray diagram illustrating the concept behind this. Light from a source (e.g. within the readhead) can hit the scale which diffracts the light into a number of diffraction orders which in turn then hit the diffraction grating in the readhead. The diffraction grating diffracts the light into further diffraction orders which recombine at the detector (e.g. a photodiode/sensor array) so as to produce an interference fringe. As the scale and readhead move relative to each other the interference fringe moves. The readhead can record and/or report movement and position by monitoring the movement of the interference fringe across the detector. Such an encoder apparatus is described in U.S. Pat. No. 5,861,953. As will be understood, reference marks can be provided, for instance embedded within the scale's diffraction features, in order to provide defined reference positions. Such an encoder apparatus is described in U.S. Pat. No. 7,659,992.

Figure 2B:
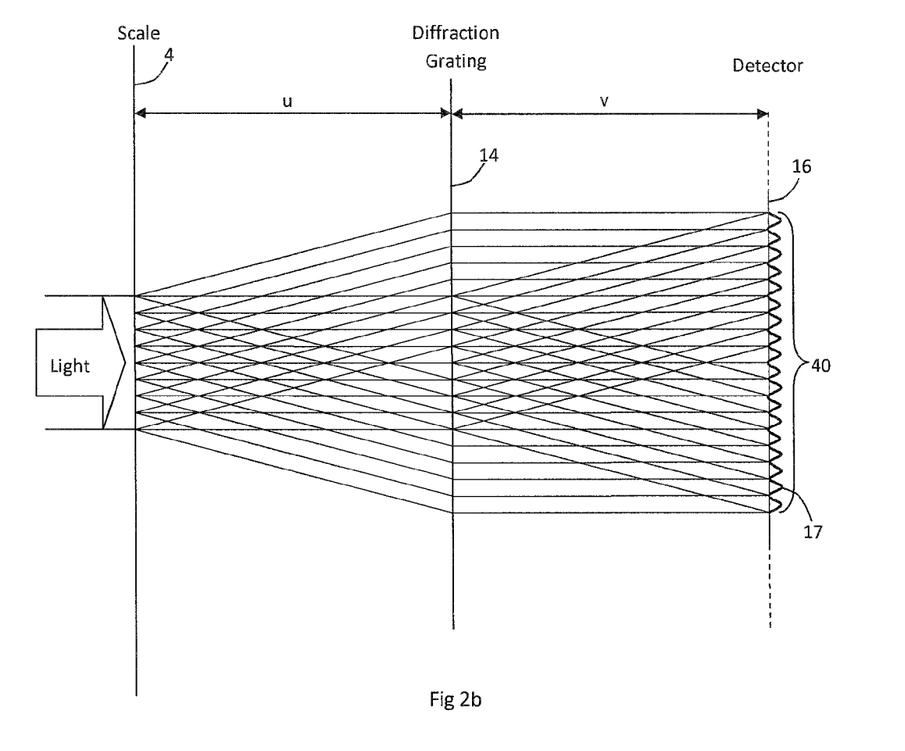

As will be understood, FIG. 2a is a very simplified illustration of the real optical situation encountered in an encoder apparatus. In particular, the situation is shown for only one light ray from the source whereas in fact an area of the scale is illuminated by the source. Accordingly, in reality the optical situation shown in FIG. 2a is repeated many times over along the length of the scale (i.e. over the area that is illuminated by the source), hence producing a long interference pattern at the detector, which is schematically illustrated in FIG. 2b. Also, for illustrative purposes only the +/−1$^{st}$ orders are shown (e.g. as will be understood the light will be diffracted into multiple orders, e.g. +/−3$^{rd}$, +/−5$^{th}$, etc diffraction orders). Further still, for the sake of simplicity of illustration the ray diagrams are shown as transmissive ray diagrams (that is the light is shown as being transmitted through each of the scale and diffraction grating, whereas in reality at least one of these could be reflective).

Another type of incremental scale is described in U.S. Pat. No. 4,776,701 which instead of creating an interference fringe, describes configuring the scale and diffraction grating(s) to produce (e.g. by recombining diffraction orders at the detector) a modulated spot(s) which varies in intensity as the scale and readhead move relative to each other.

Either way, the output of the readhead's detector is used to monitor the relative position of the readhead and scale. Accordingly, such encoders can rely on the recombination of diffracted orders to produce a resultant field at the detector.

Traditionally, diffraction gratings are configured such that their diffraction features are as equidistantly spaced as possible. U.S. Pat. No. 5,814,812 describes an alternative embodiment in which it suggests shifting the diffraction features such that rather than being equidistantly spaced, the spacing between them varies predictably and, in particular, periodically.

The present invention relates to an improved optical element that has diffraction features for creating diffraction orders used in the generation of the field detected by the detector. In particular the invention relates to an optical element in which the diffraction features are arranged such that they have been shifted from an otherwise nominally regular spaced arrangement.

In particular, the present invention provides an encoder apparatus for determining movement between two relatively moveable parts of an apparatus, the encoder apparatus comprising: a detector; and at least one optical element comprising at least one series of consecutive diffraction features for diffracting electromagnetic radiation from a source into diffraction orders and which are for contributing to the production at the detector a signal varying with movement between the two parts (e.g. via the recombination of diffraction orders at the detector), characterised in that the series of consecutive diffraction features of at least one of the at least one optical elements comprises at least one set of diffraction features within which the spacing between the centres of adjacent diffraction features varies irregularly from one pair of adjacent diffraction features to the next.

This application describes an encoder apparatus for determining movement between two relatively moveable parts of an apparatus, via a readhead and a scale, the encoder apparatus comprising: a detector; and at least one optical element comprising at least one series of consecutive diffraction features for diffracting electromagnetic radiation ("EMR") from a source into diffraction orders and which are for contributing to the production at the detector a signal varying with movement between the two parts via the recombination of diffraction orders at the detector, characterised in that the series of consecutive diffraction features of at least one of the at least one optical elements comprises at least one set of diffraction features within which the spacing between the centres of adjacent diffraction features varies irregularly from one pair of adjacent diffraction features to the next.

According to a first aspect of the invention there is provided an encoder apparatus for determining movement between two relatively moveable parts of an apparatus, the encoder apparatus comprising: a detector; and at least one optical element comprising at least one series of consecutive diffraction features for diffracting electromagnetic radiation from a source into diffraction orders and which are for contributing to the production at the detector of a signal varying with movement between the two parts, characterised in that the diffraction features in said at least one series are shifted from a nominally regular spacing, each feature being shifted by a selected predetermined amount so as to substantially eliminate at least one n$^{th}$ diffraction order whilst maintaining the existence of the 1$^{st}$ and at least one selected m$^{th}$ diffraction order, such that said 1$^{st}$ and selected m$^{th}$ diffraction orders contribute to the production at the detector of a signal varying with movement between the two parts.

Figure 3:
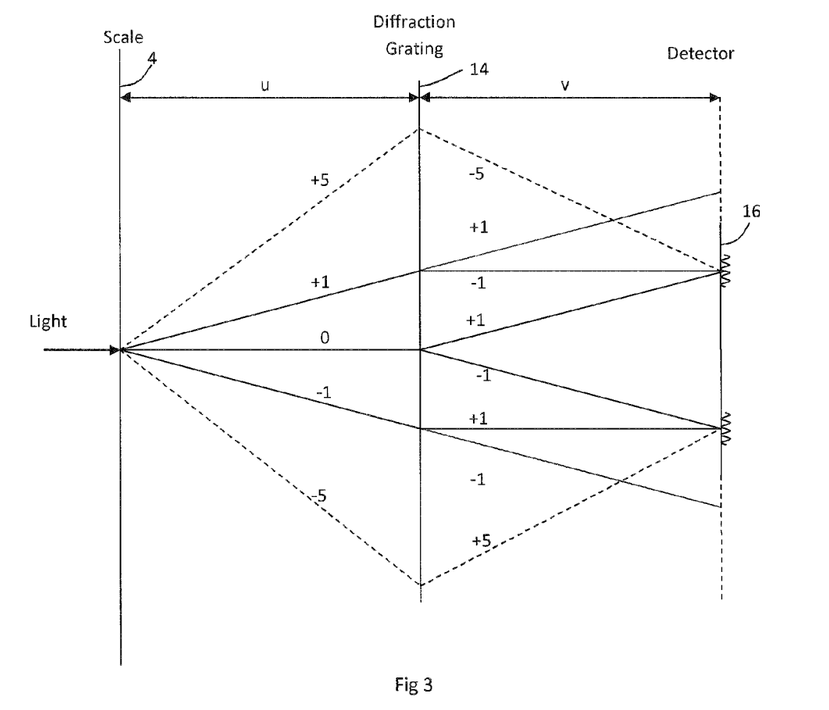
FIG. 3 is another ray diagram for an encoder apparatus illustrating the $+/-5^{th}$ diffraction orders.

As will be understood, and as mentioned above, a scale/diffraction grating for an encoder is configured to diffract the EMR received from a light source/the scale so as to generate a resultant field, such as an interference fringe or modulated spot(s) at a detector. As illustrated in connection with FIGS. 2a and 2b and explained in more detail below, the resultant field (RF), e.g. the interference fringe or the modulated spot(s), is primarily formed by the recombining of the +/−1$^{st}$ diffraction orders from the diffraction grating. However, it has been found that when using known scales and diffraction gratings, higher diffraction orders (e.g. at least the +/−5$^{th}$ orders and above, and even sometimes the +/−3$^{rd}$ order and above) can adversely interfere with the generation of the resultant field. For example, as illustrated in FIG. 3, it has been found that the +/−5$^{th}$ orders can actually fall on the detector so as to adversely affect the generation of the interference fringe. This can impose an unwanted harmonic on the interference fringe. This is also the case with other types of encoder apparatus, such as for example those which generate modulated spots instead of interference fringes.

This adverse effect of higher diffraction orders on the generation of interference fringes has been found to increase when the size and/or spacing between optical components such as the detector and a diffraction grating in the readhead and/or scale is reduced (e.g. when trying to reduce the size of the readhead). For example, this can particularly be an issue when the distance between the readhead diffraction grating and detector (shown as "v" in FIGS. 2 and 3) is not more than 10 mm, especially not more than 5 mm and for example not more than 2 mm, for instance 1.8 mm or less. This adverse effect of higher diffraction orders on the generation of interference fringes has also been found to increase with increases in the nominal period of the scale's diffraction features, e.g. when the nominal period is at least 10 μm, for example at least 20 μm, especially at least 30 μm, for instance at least 40 μm.

In particular, the adverse effect of higher diffraction orders on the generation of interference fringes has been found to be particularly problematic when the Talbot number of the encoder system falls below 7.25, more particularly below 5, especially below 2 (for example 1.75 or less), and for instance below 1 (for example 0.75 or less). As will be understood, the Talbot number (T) provides a dimensionless measurement/definition of an encoder system and can be calculated by the following equation:

$$T = \frac{\lambda u_0}{p_1 p_2}$$

Where λ is the wavelength of the illumination, $u_0$ is the distance between the first grating and the second grating (e.g. u in FIGS. 2a, 2b and 3), $p_1$ is the period of the first grating (e.g. the period of the scale 4 in FIGS. 2a, 2b and 3) and $p_2$ is the period of the second grating (e.g. the period of the diffraction grating 14 in FIGS. 2a, 2b and 3).

The inventors have found that diffraction gratings and/or scales can be designed which minimise the adverse impact of the higher orders on the resultant field.

In particular, the inventors have identified that rather than making the spacing between adjacent diffraction features constant, or even varying in a regular or predictable (e.g. periodic) manner, as is the case with known diffraction gratings, having the freedom so as to shift them from a nominally regular spacing such that the spacing between them (e.g. the spacing between their centres (e.g. their centre of masses) taken along the measuring direction of the scale) can vary selectively, for instance irregularly, can enable selected diffraction orders to be controlled so as to minimise and even substantially eliminate them, whilst substantially maintaining others. As will be understood, the exact way in which the spacing between adjacent features will vary can depend on many factors such as the type and configuration of the encoder apparatus as a whole as well as which orders are to be selectively controlled.

Accordingly, the diffraction features can be shifted from a nominally regular spacing, each feature being shifted by a selected predetermined amount so as to substantially minimise/eliminate at least one (e.g. $n^{th}$) diffraction order (e.g. an odd numbered diffraction order) whilst maintaining the existence of the 1$^{st}$ and at least one other selected (e.g. $m^{th}$) diffraction order (e.g. an odd numbered diffraction order), such that said 1$^{st}$ and at least one other selected (e.g. $m^{th}$ diffraction orders contribute to the production at the detector a signal varying with movement between the two relatively moveable parts of an apparatus.

In particular, it has been found that the intensity of select diffraction orders can be controlled by shifting the diffraction grating's and/or the scale's features away from a nominally regularly spaced arrangement to one in which the spacing between adjacent diffraction features varies irregularly from one pair of features to the next. This has been found to reduce harmonics in the resultant field at the detector (compared to an encoder apparatus comprising a diffraction grating with a constant spacing between diffraction features), resulting in a superior signal output by the detector.

As will be understood, analysis of the detector's output to determine or monitor the position could be performed within the readhead itself. Optionally, the raw (or conditioned) output of the detector could be output from the readhead to an external processor device which analyses the signal to determine or monitor the relative position of the readhead and scale.

As will be understood, a series of diffraction features can be a series of features on/in the substrate of the optical element which together diffract incoming EMR into a number of diffraction orders. For instance, the diffraction features could be marks made on the surface of the optical element's substrate. Optionally, the composition of the optical element's substrate could be manipulated to form the features. Further optionally, the shape of the optical element's substrate could be configured to form the diffraction features.

The shape, size and/or arrangement of diffraction features can vary depending on the particular implementation. Nevertheless, the diffraction features can be generally elongate in shape, for example substantially elliptical or rectangular, with their length extending substantially perpendicular to the encoder apparatus' measurement direction. The diffraction features could be in the form of amplitude diffraction features or phase diffraction features. That is for example, the optical element can be an amplitude optical element or a phase optical element, for example an amplitude scale or a phase scale, or an amplitude diffraction grating or a phase diffraction grating. As will be understood, the diffraction features of amplitude optical elements (e.g. such as amplitude scales) are configured such that they control the amplitude of EMR (e.g. by attenuation, scattering, re-direction or the like) leaving the optical element toward the detector, so as to produce diffraction orders. As will also be understood, diffraction features of phase optical elements (e.g. such as phase scales) are configured such that they control the phase of EMR (e.g. by virtue of the optical element having features with specific thickness, depth, density, material type or the like to control the phase of light) leaving the optical element toward the detector, to produce diffraction orders. Another way of looking at this is that phase diffraction features modulate the phase of light passing through/reflecting off the optical element to produce diffraction orders. As will be understood by a person skilled in the art, a combination of phase and amplitude features could be used.

The encoder apparatus' scale can be an optical element in which its series of consecutive diffraction features comprises at least one set of diffraction features within which the spacing between the centres of adjacent diffraction features varies irregularly from one pair of adjacent diffraction features to the next. The scale can comprise a reference mark between two series of consecutive diffraction features. Accordingly, a series of consecutive diffraction features can be delineated by a reference mark. As will be understood, a reference mark can be a feature which can be distinguished from the diffraction features. A reference mark can be read by a reference mark reading arrangement. Reference marks are typically used to identify "known" or "reference" locations along the length of the scale. Such a reference mark reading arrangement might comprise a reference mark sensor that is separate to the above mentioned detector. The scale can comprise more than one reference mark. As well as being embedded within the scale's diffraction features (for example, such as described in WO2005/124282, in which case reference marks can be provided by the omission of diffraction features), additionally and/or alternatively, a reference mark can be provided adjacent the scale's diffraction features as is commonly known. Likewise, in the cases in which the optical element is a diffraction grating, there might be an optical feature between two series of consecutive diffraction features, such as a Fresnel zone plate, reference mark reading element (e.g. lens), slit, clear region or other optical element.

The readhead can comprise the detector. The readhead can comprise a diffraction grating. The diffraction grating can interact with electromagnetic radiation (e.g. from the scale) to produce the signal at the detector (e.g. via effecting the recombination of diffraction orders at the detector).

The readhead's diffraction grating can be an optical element in which its series of consecutive diffraction features comprises at least one set of diffraction features within which the spacing between the centres of adjacent diffraction features varies irregularly from one pair of adjacent diffraction features to the next.

The scale and diffraction grating can both comprise said at least one optical element. That is the scale and diffraction grating can both be optical elements in which their series of consecutive diffraction features comprises at least one set of diffraction features within which the spacing between the centres of adjacent diffraction features varies irregularly from one pair of adjacent diffraction features to the next.

In other words, in line with the above, the scale can be the at least one optical element referred to above, a diffraction grating can be the at least one optical element referred to above, or the scale and a diffraction grating can be the at least one optical element referred to above.

In the case of the optical element being a readhead's diffraction grating, then the range of the variation in the spacing between the centres of adjacent diffraction features in said at least one set of diffraction features can be not less than $1/200^{th}$ of the average spacing between the centres of adjacent diffraction features, for instance not less than $1/100^{th}$ of the average spacing.

As will be understood, the range in absolute terms will depend on the system used, but can for example be at least 5 μm (microns), for instance at least 10 μm (microns), optionally at least 15 μm (microns), for instance 17 μm (microns) or more, and optionally not more than 30 μm (microns), for example not more than 20 μm (microns).

In the case of the optical element being a scale, then the range of the variation in the spacing between the centres of adjacent diffraction features in said at least one set of diffraction features can be not less than $1/20^{th}$ of the average spacing between the centres of adjacent diffraction features, for instance not less than $1/10^{th}$ of the average spacing, and optionally not more than $1/2$ of the average spacing, for instance not more than $1/4$ of the average spacing.

The average spacing between the centres of adjacent diffraction features in said series of consecutive diffraction features can be, for example, not more than 2 mm, more preferably not more than 1 mm, especially preferably not more than 0.5 mm, and for example can be not less than 500 nm, for example not less than 1 μm (micron).

The diffraction features can be arranged such that the intensity of at least the $+/-5^{th}$ and/or $7^{th}$ (and/or higher odd orders) diffraction order resulting from the optical element is attenuated compared to a scale having equally, or even predictably or periodically varying, spaced diffraction features. The diffraction features can be arranged such that the intensity of at least the $+/-5^{th}$ and/or $7^{th}$ (and/or higher odd orders) diffraction order resulting from the optical element is substantially eliminated. In particular, the diffraction features can be arranged such that the intensity of at least the $+/-5^{th}$ diffraction order resulting from the optical element is not more than 0.75%, for example not more than 0.5% of the intensity of the incident light on the optical element, and possibly even less, such as not more than 0.05% of the intensity of the incident light on the optical element. For example, the diffraction features can be arranged such that the intensity of at least the $+/-7^{th}$ diffraction order resulting from the optical element is not more than 0.25%, for example not more than 0.1% of the intensity of the incident light on the optical element, and possibly even less, such as not more than 0.05% (and for example 0.02%, or even 0.015% or less) of the intensity of the incident light on the optical element.

Furthermore, the diffraction features can be arranged such that the intensity of at least the $+/-1^{st}$ diffraction order resulting from the optical element is at least 20%, optionally at least 30%, for example 36% or more of the intensity of the incident light on the optical element.

Further still, the diffraction features can be arranged such that the intensity of at least the $+/-3^{rd}$ diffraction order resulting from the optical element is at least 1%, optionally at least 1.5%, for example 1.9% or more of the intensity of the incident light on the optical element. However, as will be understood, this need not be the case and for example the diffraction features can be arranged such that the intensity of at least the $+/-3^{rd}$ diffraction order resulting from the optical element is not more than 1%.

The diffraction features can be arranged such that the ratio of the intensity of the $1^{st}$ order to the $5^{th}$ order (or indeed any odd diffraction order higher than the $5^{th}$ diffraction order) is at least 100:1, optionally at least 200:1, for example at least 300:1, and possibly even more such as at least 700:1. The diffraction features can be arranged such that the ratio of the intensity of the $1^{st}$ order to the $7^{th}$ order (or indeed any higher odd diffraction order) is at least 150:1, optionally at least 300:1, for example at least 500:1, and possibly even more such as at least 1500:1, or higher still such as at least 3000:1.

The distance between the detector and the diffraction grating can be, for example, not more than 50 mm, preferably not more than 10 mm, especially preferably not more than 5 mm, for example not more than 2 mm, for instance 1.8 mm or less.

The readhead can comprise an EMR source (e.g. a light source). EMR from the EMR source (e.g. light from the light source) can first interact with the scale to produce diffraction orders before interacting with the diffraction grating to produce further diffraction orders. However, as will be understood, other arrangements are possible. For instance, EMR from the EMR source can interact with a diffraction grating prior to the scale (and optionally also with the same or a different diffraction grating after the scale as well).

The diffraction grating can be configured to interact with EMR (e.g. light) (e.g. from the scale) to produce an interference fringe field at the detector which changes as movement between the scale and readhead occurs. Accordingly, the detector can be configured to output a signal in response to the changing field.

The spacing between adjacent diffraction features can vary irregularly from one pair of adjacent features to the next, such that the signal output by the detector is substantially harmonic free.

The optical element can comprise at least one consecutive series of diffraction features in which the spacing between the centres of adjacent diffraction features do not vary irregularly from one pair of adjacent diffraction features to the next. Optionally, all of the optical element's diffraction features are arranged such that the spacing between the centres of adjacent diffraction features varies irregularly from one pair of adjacent diffraction features to the next. Accordingly, the spacing between the centres of adjacent diffraction features can vary irregularly from one pair of adjacent diffraction features to the next along the entire length of the optical element. The at least one set of diffraction features (within which the spacing between the centres of adjacent diffraction features varies irregularly from one pair to the next) can be repeated at least once along the length of the optical element (i.e. so that there are at least two instances of the same arrangement of diffraction features). Optionally, it can be repeated at least once within said series of consecutive diffraction features.

The width of diffraction features in the set of diffraction features can be not more than the average spacing between the centres of adjacent diffraction features.

The width of the diffraction features in said series of consecutive diffraction features can be the same. As will be understood, the widths of the spacing between the diffraction features will vary due to the variation in spacing between them.

The set of diffraction features can comprise at least five diffraction features, more preferably at least 10 features, for example at least 20 features, for example 30 features (but as will be understood, depending on the particular embodiment could be much more). In the case of the optical element being a scale, then a set of diffraction features can comprise many more diffraction features, such as at least 100 features (but as will be understood, depending on the particular embodiment could be much more, for instance many thousands of features).

According to a second aspect of the invention there is provided an optical element for generating diffraction orders (e.g. for an encoder apparatus), comprising: an array of diffraction features arranged such that the spacing between the centres of adjacent diffraction features varies irregularly from one pair of adjacent features to the next. The spacing between the centres of adjacent diffraction features can vary irregularly from one pair of adjacent features to the next, such that the ratio of the intensity of the 1st diffraction order to the 5th diffraction order is at least 100:1, and/or the ratio of the intensity of the 1st diffraction order to the 7th diffraction order is at least 150:1.

In line with the above, the optical element can be a diffraction grating for an encoder readhead. The optical element can be a scale.

According to a third aspect of the invention there is provided a readhead for an encoder apparatus comprising a detector and a diffraction grating, in which the spacing between the centres of adjacent diffraction features on the diffraction grating varies irregularly from one pair of adjacent features to the next.

According to fourth aspect of the invention there is provided a method of manufacturing a diffraction grating for an encoder apparatus comprising determining a select arrangement of diffraction features such that the spacing between the centres of adjacent diffraction features varies irregularly from one pair of adjacent features to the next such that the intensity of the diffraction orders comply with predetermined criteria, and forming diffraction features on a substrate according to said select arrangement. Examples of predetermined criteria for the intensity of diffraction orders are given above and below in connection with the other aspects of the invention (e.g. the ratios of the intensity of the $1:n^{th}$ orders).

According to a further aspect of the invention there is provided an optical element for generating diffraction orders for an encoder apparatus, comprising: an array of diffraction features configured such that the ratio of the intensity of the 1st diffraction order to the 5th diffraction order created by the array of diffraction features is at least 100:1. The array of diffraction features can be configured in that the spacing between the centres of adjacent diffraction features is chosen for each pair of adjacent diffraction features such that the ratio of the intensity of the 1st diffraction order to the 5th diffraction order created by the array of diffraction features is at least 100:1.

According to a yet further aspect of the invention there is provided an encoder apparatus comprising: a scale having a series of features; a readhead, comprising a detector and a diffraction grating comprising an array of diffraction features arranged such that the spacing between adjacent diffraction features varies irregularly from one pair of adjacent features to the next.

Embodiments of the invention will now be described, by way of example only, with reference to the accompanying drawings, in which.

Referring to FIG. 1, and as briefly described above, the encoder apparatus generally designated by reference numeral 2 comprises a scale 4 and a readhead 6. The readhead 6 is moveable relative to the scale 4 (although it could be the other way around, or indeed both could be moveable). For example, the scale 4 could be mounted to a stationary part of a machine and the readhead 6 mounted to a moveable part of a machine. The scale 4 could take many different forms, including for example linear scale as illustrated or rotary scale (e.g. provided on a ring, either on its circumferential edge or on its planar face).

In the embodiment described the scale 4 is an amplitude scale (in that it controls the amplitude of light leaving the scale toward the readhead) and comprises a substrate which has periodic features 10 in the form of dark/relatively non-reflective lines 10 made on an otherwise relatively reflective substrate such that between the periodic features 10 the scale is relatively reflective 8. Of course, the scale's periodic features could be made in other ways, such as for example by forming relatively reflective lines on an otherwise relatively non-reflective substrate, or even by forming both the relatively reflective and non-reflective lines on a substrate. As will also be understood, the periodic markings 10 could be provided in other ways, for example, the scale's features or marks could be provided in the form of facets or lines which reflect the light toward and away from the readhead. Furthermore, the scale 4 could be a phase scale, in which peaks and pits in the scale modulate the phase of light leaving the scale toward the readhead. In the embodiment described the scale's substrate is metal, although as will be understood other materials such as glass for instance could be used. The periodic marks 10 form the incremental scale facilitating measurement along the X axis (the "measurement dimension"). As will be understood, a reference mark can be provided either next to or embedded within the periodic marks making up the incremental scale. Details of such reference marks are well known and for instance described in U.S. Pat. No. 7,659,992, the content of which is incorporated into this specification by this reference.

Figure 4:
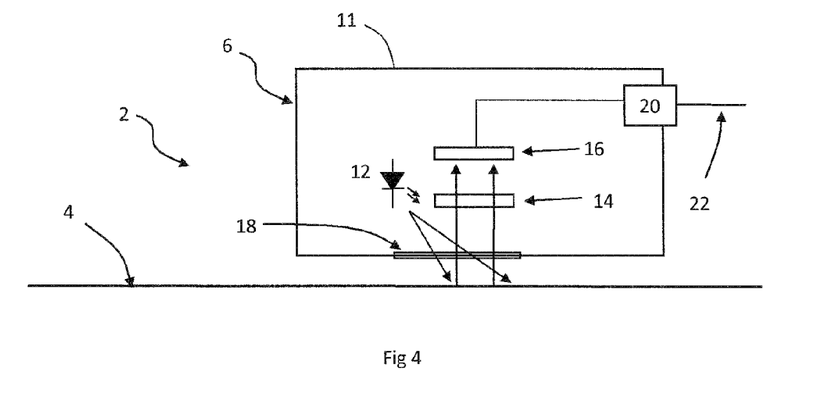
FIG. 4 is a schematic illustration of some of the components of the readhead shown in FIG. 1.

As shown in FIG. 4, the readhead 6 comprises an electromagnetic radiation ("EMR") source, in particular a light source 12, for example a light emitting diode ("LED"), a diffraction grating 14 and a detector 16. As will be understood, other components might be present in the readhead, depending on the particular implementation. For instance, a lens might be present, e.g. to collimate the EMR/light from the source. If the readhead 6 is to be used with scale comprising a reference mark, then the readhead 6 could also comprise components for detecting the reference mark(s), such as a lens and another detector. Again, such a set up is described in U.S. Pat. No. 7,659,992.

With reference to FIGS. 2a, 2b and 4, light from the light source 12 is emitted from the readhead 6 toward the scale 4 through a window 18 in the readhead's housing 11. In the current embodiment, the light has a wavelength in the region of 850 nm, but of course this could vary depending on the specific implementation and need not necessarily be visible light but instead could be EMR having a wavelength of anything from 300 nm to 2000 nm, for example. As will be understood, the choice of a suitable wavelength for the source can depend on many factors, including the availability of suitable gratings and detectors that work at the EMR wavelength. The light is diffracted and reflected by the scale 4, back through the window 18 toward the diffraction grating 14 where the light is diffracted again before forming a resultant field 40 (see FIG. 2b) (in this case an interference fringe, but could for example be modulated spot(s)) at the detector 16. As will be understood, other variations are possible, and for example a separate window 18 might not be needed, but instead the readhead could be configured such that the diffraction grating 14 is provided on the outermost surface of the readhead and is the component via which light enters the readhead.

The detector 16 detects the resultant field (e.g. the interference fringes) to produce a signal which is output by the readhead via interface 20 and cable 22 to an external device. In particular, relative movement of the readhead 6 and scale 4 causes a change in the resultant field (e.g. movement of the interference fringes relative to the detector 16 or a change in intensity of the modulated spot(s)) at the detector 16, the output of which can be processed to provide an incremental up/down count which enables an incremental measurement of displacement. As shown in FIG. 2b, the resultant field 40 is produced by the recombination of diffracted orders of light from the diffraction grating 14 and scale 4.

Figure 10:
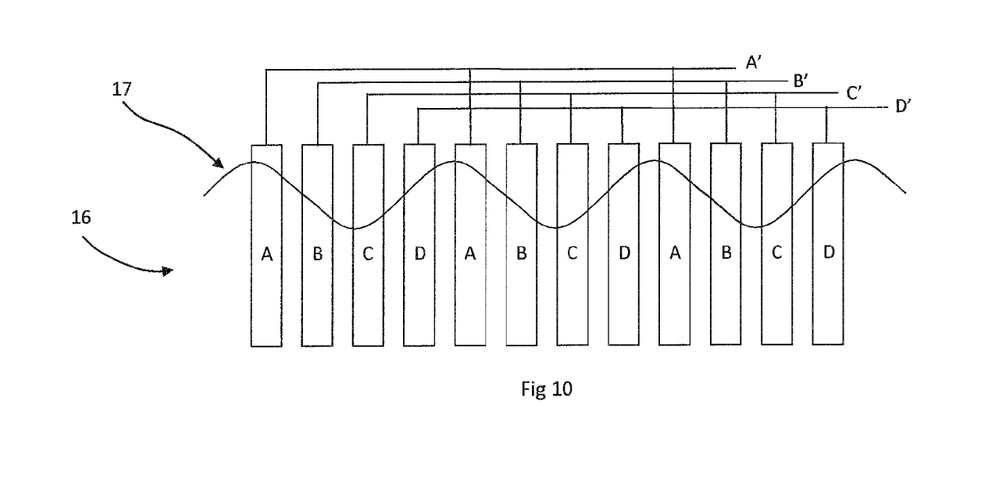
FIG. 10 is a schematic drawing of one type of detector suitable for use in the readhead of FIG. 1.

The detector 16 can comprise a plurality of photodiodes, for example. In particular, as will be understood, in embodiments in which an interference fringe 17 is produced at the detector 16, the detector 16 can be in the form of an electrograting, which in other words is a photo-sensor array which can for example comprise two or more sets of interdigitated/interlaced photo-sensitive sensors, each set detecting a different phase of the interference fringe 17 at the detector 16. An example is illustrated in FIG. 10, in which a part of a detector 16 is shown, and in which the photodiodes of four sets of photodiodes A, B, C and D are interdigitated, and the outputs from each photodiode in a set are combined to provide a single output, A', B', C' and D'. As illustrated, at any one instant in time, all the photodiodes in any one set detect the intensity of same phase of the interference fringe (if the fringe period and sensor period are the same). This arrangement has the advantage that due to a filtering effect of the optics, the readhead 6 is largely immune to the presence or absence of either of the reflective 8 or non-reflective 10 lines of the scale. Thus, the presence of contamination and/or any reference mark does not significantly affect the interference fringe detected by the detector 16. More details of a scale and readhead of this type are described in U.S. Pat. No. 5,861,953, the entire contents of which are incorporated into this specification by this reference. As will be understood, the electrograting/photo-sensor array can take other forms, such as comprising only three sets of photodiodes that are interdigitated, and different layouts can be used.

Figure 5:
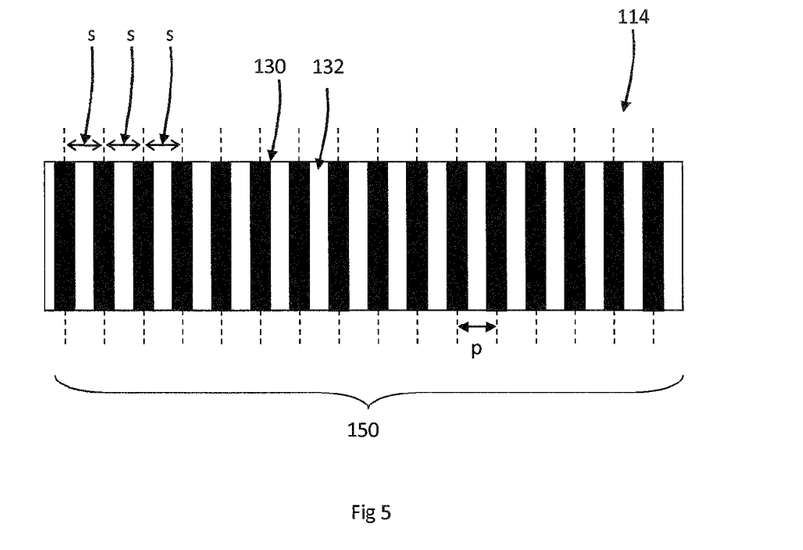
FIG. 5 is a schematic illustration of the diffraction features on a standard diffraction grating.

FIG. 5 is a schematic plan illustration of a known diffraction grating 114. As will be understood, the diffraction grating 114 comprises a series 150 of consecutive diffraction features 130 arranged periodically such that when light passes through the diffracting grating 114 (or is reflected off the diffraction grating), the light is diffracted/split into multiple orders. As shown in FIG. 5, the diffraction features 130 are arranged periodically, that is they occur at a period "p", such that the distance between the centres of adjacent pairs of the same type of feature is constant along the length of the diffraction grating (i.e. is always "s").

As will be understood, the diffraction grating 114 is not shown to scale and is merely schematic to aid illustration of the invention. In the embodiment described the diffraction grating is a phase grating. This means that the diffraction features 130 manipulate (in other words modulate) the phase of the light passing through/reflected off the diffraction grating in order to create the diffraction orders. This could be achieved for example by the depth of the grating being different at the diffraction features (e.g. the depth of the diffraction grating substrate at the features illustrated by the dark bars 130 could be shallower than that at the features illustrated by the light bars 132). Accordingly, the dark 130 and light 132 bars in FIG. 5 merely represent regions which affect the phase of light passing through it in to a different extent, e.g. the dark 130 and light 132 bars represent different depths of the diffraction grating's 114 substrate. It could well be, and for example it could be preferable, that the opacity/reflectivity of the diffraction features 130 are the same as the other regions 132 of the diffraction grating 114. As will be understood, other types of diffraction grating include amplitude gratings in which the features manipulate/modulate the amplitude of light passing through/reflected off the diffraction grating in order to create the diffraction orders.

Figure 6:
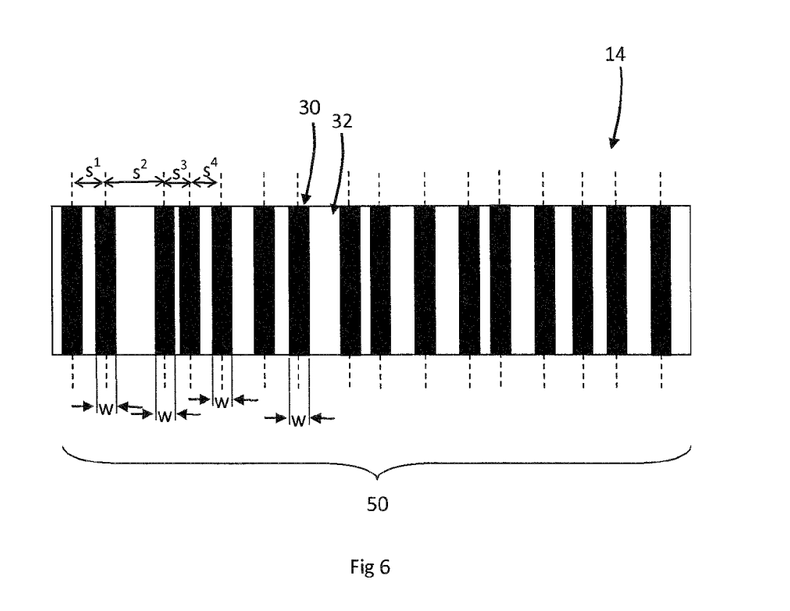
FIG. 6 is a schematic illustration of the diffraction features on a diffraction grating according to the invention.

FIG. 6 is a schematic plan illustration of a diffraction grating 14 according to the present invention. Again, the diffraction grating 14 comprises a series 50 of consecutive diffraction features 30 arranged and configured such that when light passes through the diffraction grating 14, the light is diffracted/split into multiple orders. However, the diffraction features 30 have been deliberately and selectively shifted from their nominally periodic "p" position such that the spacing "$s_n$" between adjacent diffraction features 30 varies from one pair of diffraction feature to the next. For instance, the distance between the first pair of diffraction features 30 represented by the dark lines is $s_1$, whereas the distance between the next pair is $s_2$. In the embodiment according to the invention, the spacing $s_n$ between such adjacent pairs of diffraction features 30 varies irregularly along the length of the scale. That is, the variation in the spacing $s_n$ does not change periodically or according to any sort of recognisable pattern.

In the example described the width "w" of the diffraction feature 30 of diffraction grating 14 (that is their size taken in a dimension parallel to the extent of the series of diffraction features) is constant for all the diffraction features 30. However, this need not necessarily be the case and their widths could vary.

In the embodiment described above in connection with FIG. 6, the dark bars 30 are selected/described as the diffraction features. Nevertheless, as will be understood, the invention is equally applicable if the part of the diffraction grating 14 represented by the light bars 32 are selected/described as the diffraction features. This is because as can be seen the spacing between the centres of the light bars 32 also varies irregularly from one pair to the next. In line with the paragraph above, this also illustrates that the widths of the diffraction features can vary.

In the embodiment described above in connection with FIG. 6, the series 50 of consecutive diffraction features comprises only one set of diffraction features within which the spacing between the centres of adjacent diffraction features varies irregularly from one pair of adjacent diffraction features to the next. That is the length of the set is the same as the length of the series 50, which is also the length of the diffraction grating 14. However, this need not necessarily be the case and for instance the series 50 of consecutive diffraction features might comprise one or more repeating sets of diffraction features within which the spacing between the centres of adjacent diffraction features varies irregularly from one pair of adjacent diffraction features to the next. This is described in more detail below in connection with the embodiment of FIG. 9.

Figure 7:
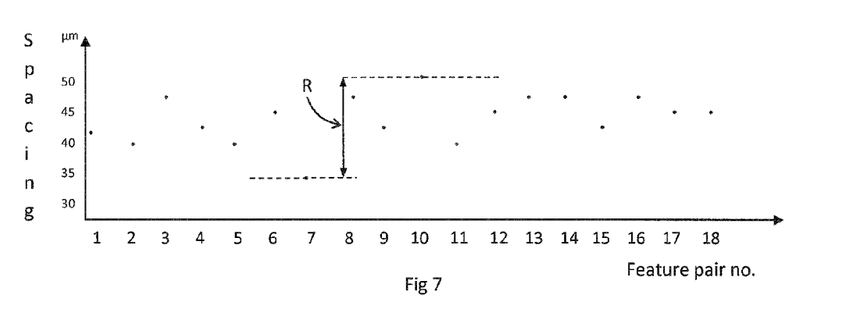
FIG. 7 is a graph illustrating the variation in separation between adjacent diffraction features on an example diffraction grating according to the invention.

FIG. 7 is a graph illustrating the variation in spacing between adjacent pairs of the diffraction features 30 of the diffraction grating 14 shown in FIG. 6 (which has an average feature spacing of approximately 43 μm). As can be seen, the variation in the spacing is not constant, not constantly increasing or decreasing, and not varying according to some periodic function. Rather, the variation is irregular with no recognisable pattern. As explained below, this is because the position shift of each feature from its nominally periodic position is chosen independently so that they manipulate the diffraction orders as needed (e.g. in order to minimise the intensity of the +/−$5^{th}$ order), rather than according to some predetermined function. Also illustrated in FIG. 7 is the range "R" of the variation in the spacing between adjacent diffraction features, which in this case is 17 μm (microns) (in the illustrated example the biggest spacing is 51 μm (microns) and the smallest spacing is 34 μm (microns)).

The table below gives an example of another embodiment for a phase diffraction grating according to the invention. In this case, the table represents the shift of each feature from a nominal feature spacing of 46.67 μm (micron) (and hence width of 23.34 μm (micron)) which would be suitable for use in an encoder having an amplitude scale of 40 μm (micron).

| Feature number | Offset from nominal feature spacing (μm (micron)) |
| --- | --- |
| 1 | −3.49 |
| 2 | −6.98 |
| 3 | −6.98 |
| 4 | −4.36 |
| 5 | −6.11 |
| 6 | −3.49 |
| 7 | −4.36 |
| 8 | −3.49 |
| 9 | −6.11 |
| 10 | −6.98 |
| 11 | −6.11 |
| 12 | −3.49 |
| 13 | −3.49 |
| 14 | −4.36 |
| 15 | −3.49 |
| 16 | −0.87 |
| 17 | −2.62 |
| 18 | −1.75 |
| 19 | 0.00 |
| 20 | 0.00 |
| 21 | −2.62 |
| 22 | −0.87 |
| 23 | 0.00 |
| 24 | 0.00 |

In the above embodiments, the spacing between adjacent pairs of diffraction features varies because the diffraction grating has been generated according to a process in which the diffraction features have been deliberately/purposefully shifted from their nominally periodic/regular position by a select amount so as to control the diffraction orders produced by the diffraction grating. The process by which the shift of each feature from its nominally periodic/regular position can be determined could for instance involve an iterative algorithm, such as for example a Direct Binary Search. Such a process can involve modelling the behaviour of the encoder system and iteratively going through multiple configurations in order to arrive at an optimum solution via a minimisation process.

As will be understood, the particular arrangement of the diffraction features 30 on the diffraction grating 14 will depend on many factors including the type of encoder the diffraction grating is to be used in and/or what and/or how the diffraction orders are to be controlled. For instance, in some circumstances it might be desirable to attenuate the $+/-3^{rd}$ diffraction order whereas in other circumstances it might be desirable to strengthen the $+/-5^{th}$ diffraction order. Accordingly, the particular arrangement of diffraction features needed to provide for these different scenarios will be different.

As will be understood, the extent of shift is grossly exaggerated in FIG. 6 to aid illustration of the invention. For example, the nominal periodic spacing "p" of the diffraction features could be 20 μm (microns), and the shift of diffraction features from its nominal periodic position could be up to +/-p/2, e.g. in the given example +/-10 μm (microns), for example. A typical diffraction grating for an encoder readhead might be 2 or 3 mm long, and so the typical number of diffraction features can be in the order of 100-150. In particularly preferred embodiments, especially when the readhead is designed to be as small as possible, the diffraction grating could be even smaller, and for instance between 1 mm and 2 mm long, such as for example between 1.4 mm and 1.5 mm long. In this case, the number of diffraction features can be even smaller, such as somewhere between 25 and 35, for example 30.

Figure 8:
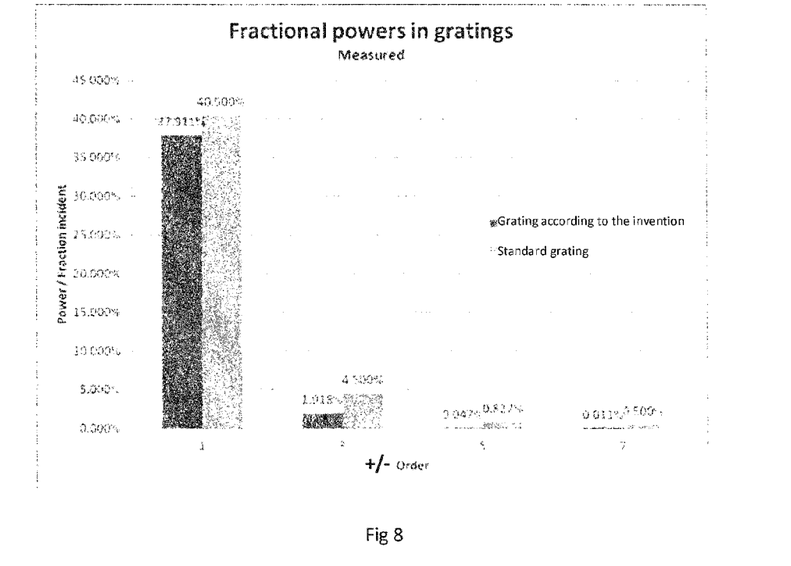
FIG. 8 is a graph illustrating the intensity of the orders created by diffraction gratings shown in FIGS. 5 and 6.

As mentioned above it has been found that providing for such irregular variation in the spacing between adjacent diffraction features means that the placement of such diffraction features can be selected so as to control the diffraction orders created by the diffraction grating. Accordingly, for example, as described above it can be preferred that the intensity of the $+/-5^{th}$ diffraction order be minimised in order to improve the quality of the resultant field produced at the detector 16, e.g. in order to remove harmonics in the signal produced by the detector 16. It has been found that a diffraction grating according to the present invention can be used to achieve this. For example, FIG. 8 shows a bar chart illustrating the intensity of different orders (as a percentage of the incident light) produced from a standard diffraction grating in which the spacing between adjacent pairs of diffraction features is constant along the length of the scale, and also the intensity of different orders produced from a diffraction grating according to the invention. As can be seen, the intensity of the $+/-5^{th}$ and above orders have been significantly reduced compared to the standard grating. In the embodiment described, the diffraction grating 14 has been designed such that there is still some significant $+/-3^{rd}$ order as well as $+/-1^{st}$ order because it has been found that in some circumstances the $+/-3^{rd}$ order can contribute positively to the formation of the interference fringe at the detector 16. However, as will be understood, this need not necessarily be the case and for example the diffraction grating 14 could be designed such that the $+/-3^{rd}$ order is also substantially eliminated. The bar chart of FIG. 8 is marked up with values actually measured from a diffraction grating according to the invention, and values actually measured from a standard diffraction grating. The standard diffraction grating is "standard" in that it is the same as the diffraction grating according to the invention (i.e. same material, same feature size, same type (e.g. both phase gratings), same nominal feature period, etc) except that rather than the spacing between adjacent diffraction features varying irregularly from one pair to the next (as with the diffraction grating of the invention), the diffraction features are regularly spaced. The intensities of the orders and incident light are measured by placing the diffraction grating into a holding jig. Laser light (in this case 850 nm (nanometers)) is arranged to be incident on the grating which produces a set of diffraction orders some distance away. The diffraction orders are measured using a power meter connected to a rotating stage. When the stage moves, a measurement is taken from the power meter and logged to a computer. The stage takes a measurement every 0.003 degrees. This produces a large set of power measurements over a given angle range. In order to help reduce noise in the measurements, localised averaging of the data can be used. For instance an average of 10 points over 0.03 degrees is taken. Furthermore, the intensity of the incident light is measured by the power meter by repeating the above, but where the laser light is arranged to pass light through a blank region of the grating which has no diffraction features. As will be understood, other set ups could be used to measure the intensities. For instance, the grating/jig could be moved instead of/as well as the power meter. Optionally, multiple power meters could be used (e.g. one for each diffraction order to avoid having to provide movement). Optionally, multiple diffraction orders could fall simultaneously on a single CCD (e.g. so that they can be measured simultaneously).

As can be seen, in this case, the diffraction grating according to the invention provides a measured ratio of the intensity of the $1^{st}$ order to the $5^{th}$ order which is above 800:1, and provides a measured ratio of the intensity of $1^{st}$ order to the $7^{th}$ order which is above 3000:1:

In the embodiments described above, it is the diffraction grating's diffraction features that have been arranged such that their spacing varies irregularly in order to improve the signal output by the detector. However, this need not necessarily be the case, and other optical elements, such as for instance the scale's diffraction features 10 (or 8) could instead, or in addition, be configured such that their spacing varies irregularly so as to control the diffraction orders created by the diffraction grating in order to improve the quality of the resultant field produced at the detector 16, e.g. in order to remove harmonics in the signal produced by the detector 16. Again, this could be achieved by using an iterative process as described above in order to determine the spacing of the features.

Figure 9:
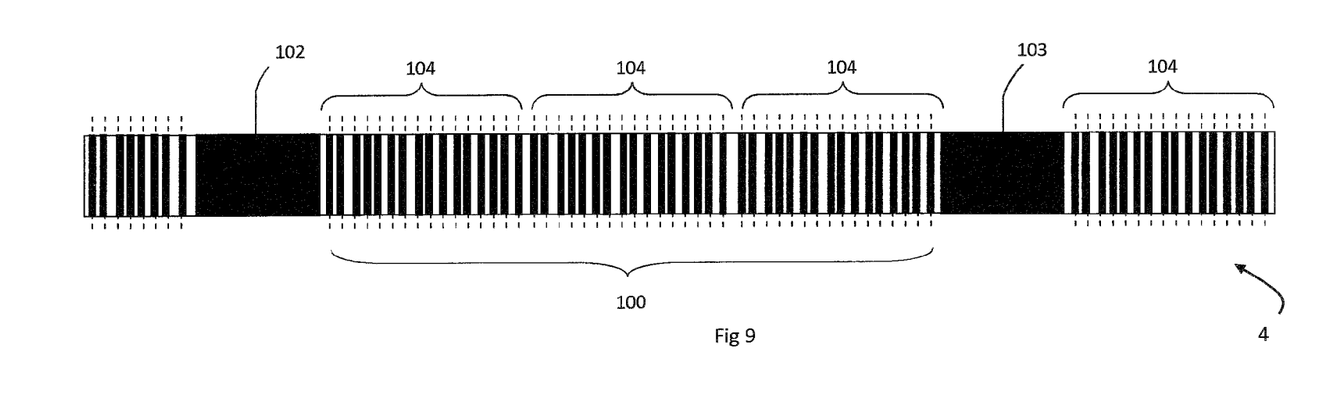
FIG. 9 is a schematic illustration of the diffraction features on a scale, with a repeating feature set, according to the invention.

Accordingly, the arrangement shown in FIG. 6 could be the scale 4 instead of the diffraction grating 14. However, scales 4 are typically much longer than the diffraction grating (that is even though they can be as small as a few millimeters long, they can be as large as many meters, even tens of meters long) and hence the position of a greater number of features needs to be determined. This burden could be reduced by determining the position of a set number of diffraction features along a set length of the optical element (e.g. the scale 4) using the iterative process described above, and then using the results of that process multiple times along the length of the optical element (e.g. the scale 4), e.g. as illustrated in FIG. 9. In particular, as shown in FIG. 9, the scale 4 comprises a series 100 of consecutive diffraction features which as shown are delineated by reference marks 102, 103. Within the series 100 of consecutive diffraction features there is a set 104 of diffraction features within which the spacing between the centres of adjacent diffraction features varies irregularly from one pair of adjacent diffraction features to the next. As shown, this same set 104 is repeated twice more within the series 100 of consecutive diffraction features. As shown, the same set 104 is also used in a different series of consecutive diffraction features (subsequent to the second reference mark 103 shown). As will be understood, this need not necessarily be the case and different sets of diffraction features, within each of which the spacing between the centres of adjacent diffraction features varies irregularly from one pair of adjacent diffraction features to the next, could be used. Furthermore, although the same set 104 is used three times in the series 100 of consecutive features, different sets could be used. For instance, the set 104 of diffraction features could be used twice in the series 100 of consecutive diffraction features, and these two identical sets could be separated by a different set of diffraction features.

In the embodiments described above, the encoder apparatus comprises a diffraction grating in the readhead, but this need not necessarily be the case. Indeed, it is possible that no diffraction grating is needed at all. In this case the only optical element according to the invention is the scale. Such an encoder is for example described in US2003/0010906.

Furthermore, in the embodiment described above light from the source interacts with the scale before the diffraction grating in the readhead, but as will be understood this need not necessarily be the case. For instance, the encoder apparatus could be configured such that the light from the source interacts with a diffraction grating (e.g. in the readhead) before it interacts with a scale (and optionally also interacts with another or the same diffraction grating (e.g. in the readhead) after the scale).

In the embodiments described above, all of the diffraction grating's diffraction features, and/or the all of the scale's diffraction features are arranged such that their spacing between the centres of adjacent diffraction features varies irregularly from one pair of adjacent diffraction features to the next. This need not be the case. For instance, only some of them need be arranged this way, with the others being arranged with non-irregular spacing, e.g. being constantly spaced.

The invention claimed is:

1. An encoder apparatus for determining movement between two relatively moveable parts of an apparatus, the encoder apparatus comprising:
   a detector; and
   at least one optical element comprising at least one series of consecutive diffraction features for diffracting electromagnetic radiation from a source into diffraction orders and which are for contributing to the production at the detector of a signal varying with movement between the two parts,
   wherein the diffraction features in said at least one series are shifted from a nominally regular spacing such that the spacing between the centres of adjacent diffraction features selectively varies irregularly from one pair of adjacent diffraction features to the next, each feature being shifted by a selected predetermined amount so as to substantially eliminate at least one $n^{th}$ diffraction order whilst maintaining the existence of the $1^{st}$ and at least one selected $m^{th}$ diffraction order, such that said $1^{st}$ and selected $m^{th}$ diffraction orders contribute to the production at the detector of the signal varying with movement between the two parts.

2. An encoder apparatus as claimed in claim 1, in which the encoder apparatus comprises a readhead comprising the detector and a diffraction grating, and optionally in which the encoder apparatus comprises a scale and the diffraction grating is configured to interact with electromagnetic radiation from the scale to effect the recombination of diffraction orders at the detector.

3. An encoder apparatus as claimed in claim 2, in which the readhead's diffraction grating comprises said at least one optical element.

4. An encoder apparatus as claimed in claim 1, in which the encoder apparatus comprises a scale which comprises said at least one optical element, and optionally, in which the scale comprises a reference mark between two series of consecutive diffraction features.

5. An encoder apparatus as claimed in claim 1, in which the range of the variation in the spacing between the centres of adjacent diffraction features in said at least one set of diffraction features is not less than $\frac{1}{200}^{th}$ of the average period of the diffraction grating's features.

6. An encoder apparatus as claimed in claim 1, in which the diffraction features are arranged such that the ratio of the intensity of the $1^{st}$ order to the $5^{th}$ order is at least 100:1, and/or the ratio of the intensity of the $1^{st}$ order to the $7^{th}$ order is at least 150:1.

7. An encoder apparatus as claimed in claim 1, in which the spacing between adjacent diffraction features varies irregularly from one pair of adjacent features to the next, such that the signal output by the detector is substantially harmonic free.

8. An encoder apparatus as claimed in claim 1, in which said set of diffraction features is repeated at least once along the length of the optical element, and optionally repeated at least once within said series of consecutive diffraction features.

9. An encoder apparatus as claimed in claim 1, in which said set of diffraction features comprises at least five diffraction features.

10. An encoder apparatus as claimed claim 1, in which the spacing between the centres of adjacent diffraction features varies irregularly from one pair of adjacent diffraction features to the next along the entire length of the optical element.

11. An encoder apparatus as claimed in claim 1, wherein shifting each of the features by the selected predetermined amount reduces harmonics in an interference fringe at the detector.

12. An optical element for generating diffraction orders comprising at least one series of consecutive diffraction features for diffracting electromagnetic radiation from a source into diffraction orders, wherein the diffraction features in said at least one series are shifted from a nominally regular spacing such that the spacing between the centres of adjacent diffraction features selectively varies irregularly from one pair of adjacent diffraction features to the next, each feature being shifted by a selected predetermined amount so as to substantially eliminate at least one $n^{th}$ diffraction order whilst maintaining the existence of the $1^{st}$ and at least one selected $m^{th}$ diffraction order.

13. An optical element as claimed in claim 12, in which the range of the variation in the spacing between the centres of adjacent diffraction features in said series of diffraction features is not less than $\frac{1}{200}^{th}$ of the average period of the diffraction grating's features.

14. An optical element as claimed in claim 12, in which the optical element is a diffraction grating for an encoder readhead.

15. An optical element as claimed in claim 12, in which the diffraction features are arranged such that the ratio of the intensity of the $1^{st}$ order to the $5^{th}$ order generated by the optical element is at least 100:1, and/or the ratio of the intensity of the $1^{st}$ order to the $7^{th}$ order generated by the optical element is at least 150:1.

16. An optical element as claimed in claim 12, in which the spacing between the centres of adjacent diffraction features varies irregularly from one pair of adjacent diffraction features to the next along the entire length of the optical element.

17. An optical element as claimed in claim 12, in which said series of diffraction features comprises at least five diffraction features.

18. A readhead for an encoder apparatus comprising a detector and a diffraction grating comprising at least one series of consecutive diffraction features for diffracting electromagnetic radiation from a source into diffraction orders, wherein the diffraction features in said at least one series are shifted from a nominally regular spacing such that the spacing between the centres of adjacent diffraction features selectively varies irregularly from one pair of adjacent diffraction features to the next, each feature being shifted by a selected predetermined amount so as to substantially eliminate at least one $n^{th}$ diffraction order whilst maintain the existence of the $1^{st}$ and at least one selected $m^{th}$ diffraction order, such that said $1^{st}$ and selected $m^{th}$ diffraction orders can contribute to the production of an interference signal at the detector.

19. A readhead as claimed in claim 18, in which the range of the variation in the spacing between the centres of adjacent diffraction features is not less than $1/200^{th}$ of the average period of the diffraction grating's features.

20. A readhead as claimed in claim 18, in which the diffraction features are arranged such that the ratio of the intensity of the $1^{st}$ order to the $5^{th}$ order generated by the diffraction grating is at least 100:1, and/or the ratio of the intensity of the $1^{st}$ order to the $7^{th}$ order generated by the diffraction grating is at least 150:1.

21. A readhead as claimed in claim 18, in which the spacing between the centres of adjacent diffraction features varies irregularly from one pair of adjacent diffraction features to the next along the entire length of the diffraction grating.

22. A readhead as claimed in claim 18, in which the diffraction grating comprises an array of at least five diffraction features.

23. A method of manufacturing a diffraction grating for an encoder apparatus comprising determining a select arrangement of diffraction features such that the spacing between the centres of adjacent diffraction features varies irregularly from one pair of adjacent diffraction features to the next such that at least one $n^{th}$ diffraction order is substantially eliminated whilst the existence of the $1^{st}$ and at least one selected $m^{th}$ diffraction order is maintained to such a level that said $1^{st}$ and selected $m^{th}$ diffraction orders can contribute to the production of an interference signal at a detector of the encoder apparatus, and forming diffraction features on a substrate according to said select arrangement.

* * * * *